Patented Feb. 17, 1942

2,273,708

UNITED STATES PATENT OFFICE 2,273,708

STABLE YELLOW CUPROUS OXIDE

Loren C. Hurd, Glenside, Pa., assignor to Röhm & Haas Company, Philadelphia, Pa.

No Drawing. Application June 9, 1939, Serial No. 278,322

3 Claims. (Cl. 167—16)

This invention relates to a dry, stable form of yellow cuprous oxide and to parasiticidal and anti-fouling compositions made with yellow cuprous oxide.

The present application is a continuation-in-part of Application Serial No. 244,919, filed December 10, 1938, in which a process for producing dry, stable, yellow cuprous oxide is claimed.

The ordinary cuprous oxide of commerce is a bright red material. It is used extensively in marine paints to inhibit the attachment of barnacles to ship hulls and in fungicides. A yellow cuprous hydroxide or hydrated oxide has been known to exist and recently it has been found that this yellow form is a potent fungicide. The yellow cuprous hydroxide or hydrated oxide is, however, very unstable and it has not heretofore been produced in a stable form or in a dry state. When used as a fungicide, it has been necessary to prepare it by precipitation methods prior to spraying in much the same way the Bordeaux mixture is prepared at the scene of application. Because it has never been prepared in a dry form the yellow cuprous oxide has never been applied to marine paints.

The object of this invention is to provide yellow cuprous oxide in a dry condition. It is another object to make available a stable, yellow cuprous oxide. Still another object is to provide a stable, dry, yellow cuprous oxide that is suitable for use as an active principle in parasiticidal compositions and in anti-fouling paints. The final object is to provide parasiticidal compositions of improved efficiency containing a particularly active form of cuprous oxide.

It is now found that yellow cuprous oxide may be prepared by electrolytic methods with good current efficiency under a wide range of conditions as to voltage, current density, temperature, concentration of electrolyte, etc., if to the electrolytic bath there is added a lyophilic colloid. I have found that, under conditions which would otherwise favor the production of red cuprous oxide, yellow cuprous oxide may be obtained when a lyophilic colloid, such as glue, is added to the bath in proper amounts. The yellow product from the electrolysis may be separated and dried to yield cuprous oxide which is much more stable than hydrated oxides or hydroxides which have heretofore been known, inasmuch as the previously known precipitates were rapidly oxidized on exposure to air or reverted to red cuprous oxide on heating or standing. The yellow oxide from my process shows no tendency to revert to the red form. Its stability to oxidation, however, may be further improved by a treatment with glue or some other suitable stabilizer. The washed product from the electrolysis may be treated with a solution or dispersion of a lyophilic colloid. After operations involving filtration, drying and grinding, the yellow oxide is obtained in a dry, stable form, eminently suitable for any of its applications. This form is easy to handle and economical to ship.

The product thus obtained is yellow in color. It contains 1 to 10% of the lyophilic colloids used in its preparation. Particle size is extremely fine. The chemical composition corresponds to $Cu_2O$. It is entirely possible, of course, that the originally precipitated material is a hydrated oxide, but as finally obtained it is definitely a form of cuprous oxide.

As the first stage in the process of preparing yellow cuprous oxide in a dry, stable form, copper is anodically oxidized in an electrolytic cell. An anode of copper, which may be separated from the solution by a diaphragm, is used as the source of copper. The cathode may also be of copper, or it may be of any inert, conducting materials such as platinum, stainless steel, or graphite. The cathode is separated, or set off, by a diaphragm, which may be made from any suitable porous material such as asbestos, cotton fabric, parchment, alundum, porous ceramic ware, etc. The electrodes are suitably connected through switches, etc., to a source of electric power. If desired, suitable means may be provided for reversing the polarity of the current at the electrodes periodically. If this is done, both electrodes must be of copper.

The electrolyte used in the cell is an aqueous solution of a metal halide such as sodium or potassium chloride at concentrations from 4 or 5% up to saturation depending upon the other variables in the process. A small amount of soda ash or caustic alkali may be added to the electrolytic solution.

After electrolytic action has started, alkalinity is maintained or built up by the action of the cell and may be held between 0.1 g. to 9 g. of $Na_2O$ per liter. The hydroxyl ions in the electrolyte precipitate the copper ions before they reach the cathode.

The temperature of the cell is raised to approximately 50 to 100° C. by any convenient method, such as by steam or by an electric immersion heater. During electrolysis temperatures are maintained wholly or in part by the current flowing through the cell and little or no extra heat is required to maintain the temperature, depending upon the arrangement of the cells, external temperatures, current density and other controlling factors. A minimum voltage of about one volt appears to be necessary to make the process operate. The voltages which are most useful will depend upon the arrangement of the cells and the type of diaphragms used and may be from 1.5 to 4 volts per cell for highest efficiency. At higher voltages the current efficiency tends to decrease.

In order to obtain a useful, stable form of yellow cuprous oxide with certainty and efficiency, it is necessary to add to the electrolytic bath relatively small amounts of a proteinic lyophilic colloid. Since this colloidal material is adsorbed by the precipitating copper compound, it is necessary to add more of it continuously or periodically. Also, some addition is necessary because there may be some decomposition of the colloid by electrolytic action. With due regard for the other variables in the process there is a wide range of concentrations suitable for production of the yellow product. The presence of 0.007% or more glue or other lyophilic protein colloid in the bath at the start is sufficient under proper conditions to cause precipitation of the yellow product. But it is necessary to add more as the electrolytic action proceeds. With increasing temperatures more colloidal material becomes necessary until at about 100° C. it is advisable to have about 0.04% or more glue present at the start and to add a solution of this colloid at the rate of about 0.2 g. or more per ampere-hour per liter of solution.

Since the quantity of colloid required depends directly upon the quantity of product formed, which depends in turn upon the current passing, it is convenient to express the amount of colloidal material required in terms of ampere-hours or ampere hours per liter of solution. A range from about 0.01 gram to about 0.3 gram per ampere-hour per liter has been found suitable, the exact amount depending upon temperature, current density, concentration of electrolyte, etc. The important consideration seems to be to have the precipitated product, preferably, carry at least 2% of the colloidal material, the required amount depending on the balance of variable in the process.

When the concentration of colloidal material in the bath is increased, there is some increase in the amount of adsorbed colloid, but not in full proportion. With very high concentrations of the protein-containing lyophilic colloid there may be considerable decomposition of this material, resulting in greenish shades of color, probably due to decomposition products which combine with copper ions. In general, a range of 3 to 7% of colloidal material adsorbed by the precipitating material gives the best practical results under the preferred conditions of operation. As the amount of adsorbed colloidal material is increased within proper limits, there results a diminution in size of the individual particles. This presents one means, therefore, of controlling particle size. Properly prepared yellow cuprous oxide will contain particles all less than four microns in diameter.

A lyophilic colloid which is highly satisfactory in practical use and which is also economical is glue. Gelatine, blood albumen, egg albumen, casein, and the like are also suitable. The glue or other colloidal material is most conveniently added in the form of a solution. Apparently, these colloidal materials are adsorbed by the cuprous oxide or hydroxide particles, as they form, distorting the crystal lattice and eventually preventing further growth. Other factors which help to determine crystal size are temperature, solvent action of the medium, and current density. Organic compounds other than glue, gelatine and albumen have some influence on crystal growth, but not with the economy, effectiveness, certainty and compatibility of the lyophilic, nitrogen-containing colloids and with other organic materials the precipitated product is colored orange to red rather than yellow to orange, indicating larger particle sizes.

The finely divided cuprous compound formed is allowed to settle and is removed from time to time as a sludge, or it may be filtered out continuously by circulation of the electrolyte through a filter and back to the cell. It is washed thoroughly to remove the brine, preferably with hot water. The pH may be adjusted. At this point it is advisable to add a solution of a lyophilic, protein colloid in such an amount that the particles are coacted with about 0.1% or more of the added colloid. The use of glue and similar colloids as a preservative for cuprous oxide has been disclosed in my copending application Serial No. 190,036, filed February 11, 1938. Although other preservatives may be used, I have found none so effective and economical as the nitrogen-containing lyophilic colloids or lyophilic protein colloids. While a few tenths per cent. of the added colloid, such as glue, gives adequate protection, larger or smaller amounts may be used. By the use of larger amounts, such as 3 to 5%, gels or pastes may be prepared.

After treatment with glue or other protective agent, the sludge is filtered to remove the water and dried at 90 to 120° C., preferably under reduced pressure. The dried product is ground and sifted by suitable means, such as a pulverizer used in conjunction with screens.

The product obtained is a yellowish powder which is chiefly yellow cuprous oxide, but containing up to 7% or more of glue or other colloid and traces of chloride, copper and cupric oxide. If a small amount of red cuprous oxide is present, the color of the product tends toward the darker shades of yellow to orange without seriously impairing the activity of the yellow form. Analysis of a typical preparation showed 1.2% chloride, 0.1% copper, 4.5% cupric oxide, 3.5% glue and 90.7% $Cu_2O$. The dried product disperses easily and well in water, forms exceptionally stable suspensions, and is exceedingly effective in all applications for which cuprous oxide is recommended. The product does not revert to the red oxide during processing, drying or storage. Stability to oxidation is entirely satisfactory and in tropical chamber tests is almost equal to that of stabilized red cuprous oxide.

Analysis of the product shows that it is essentially $Cu_2O$ and not CuOH or a hydrate. It appears, therefore, that the yellow oxide is chemically the same as the red oxide, but differs greatly in the state of subdivision and the properties which depend upon this state. X-ray crystal analysis gives the same patterns as shown by red cuprous oxide but the lines of the pattern are broad and diffuse, characteristic of a material in a fine state of subdivision.

The following examples are given for purposes of illustration but the invention is not to be restricted thereto as the yellow oxide may be produced under the wide range of conditions described herein.

Example 1

A ceramic ware cell, equipped with a copper bar as an anode and another copper bar serving as a cathode and surrounded with a cotton diaphragm, was filled with a solution containing 20% sodium chloride, 0.1% glue, and soda ash to bring the alkalinity to 3 g. of $Na_2O$ per liter. The temperature of the solution was raised to 60° C. by means of an immersed steam coil. Electrolysis was then started with a current density of 0.44 ampere per sq. in. at the cathode with a potential of 1.6 volts. A 1% solution of glue was allowed to drop slowly into the cell at such a rate that 1.2 g. of glue was added per hour. After 7½ hours electrolysis was discontinued. The loss in weight of the anode was 173 grams. The sludge was removed from the cell, washed four times with hot water, adjusted to pH 6, filtered, treated with a dilute solution of glue and dried. The product contained 3.04% of glue. It was exceptionally fine and bright yellow in color. During electrolysis the average temperature of the solution was 64° C. The weight of the product showed that the cell had operated at a current efficiency of 97%.

Example 2

Two copper anodes and a copper cathode, the latter surrounded with pressed asbestos diaphragms, were mounted in a glass cell. A ten per cent. solution of sodium chloride was prepared, made slightly alkaline with soda ash, filtered and placed in the cell. A solution of glue was added until the salt solution contained about 0.1% glue. The temperature of the solution was raised to 90° C. and electrolysis started at 2.1 volts and a current density of 0.22 ampere per sq. in. at the anodes. During electrolysis glue was added in solution at the rate of 0.17 g. per ampere-hour per liter of salt solution. The alkalinity of the solution was measured from time to time and averaged 4.7 g. of $Na_2O$ per liter. The resulting product was filtered off, washed, adjusted to pH 6, treated with 0.1% glue in solution, filtered and dried under reduced pressure. The cuprous oxide was bright yellow, very fine, and stable.

As has been indicated above, the particle size depends upon a number of factors. Increasing the amount of colloidal material present in the bath tends in general to give finer particles. There is a practical and economic limit to the amount of added colloid, however, as too much colloidal material may make the solution too viscous for efficiency and cause difficulties from decomposition products. Increasing the current density within suitable limits favors fine material but tends to raise the temperature, which factor favors larger particles. But, of course, current density, like voltage, should be adjusted to give the highest current efficiency commensurate with sufficiently fine cuprous oxide. In general, current densities of 0.1 to 0.5 ampere per sq. in. are preferred. Higher current densities cause too much heat in the cell and make proper control difficult.

Lower temperatures in general favor finer particles, but efficiency falls off with decreasing temperatures. A range of 60-70° C. is to be preferred.

The solvent effect of the electrolytic bath has an influence on particle size also, but the concentration of electrolyte is preferably kept high to maintain good conductivity and keep the efficiency high. Lower ranges of concentration of electrolyte are necessary as temperatures are made high since it has been found that with higher temperatures the solvent effect of the electrolyte becomes a controlling factor. Preferred concentrations lie between 10 and 23% sodium chloride.

The nature of the electrolyte has a bearing on the valence of copper produced. With certain anions, as sulfate and nitrate, there is extensive disproportionation, that is, cuprous ions yield copper and cupric ions. Metal halides do this to a minimum degree and, as is well known, iodides yield cuprous iodide even from cupric salts. The nature of the cation in the halide is of interest because, if the metal is such that insoluble hydroxides result, they are precipitated with the copper compound. It is possible to use mixtures containing alkali chlorides to correct the difficulty of disproportionation with non-halides. In the preparation of the solutions from technical grades of chemicals it is usually necessary to filter off iron or alkaline earth hydroxides and carbonates which precipitate when the salt solution is made alkaline.

Successful operation of the process requires either the continuous addition of the lyophilic, nitrogen-containing colloid, or equivalent intermittent additions, that maintain the concentration of the lyophilic colloid in the bath above 0.02%. As heretofore explained, it has been found that the colloid is consumed in the process so that unless replenished the precipitate, although initially yellow, will progressively go over to the red form. And, since too great a concentration of protein-containing colloid in the bath detracts from the efficiency of the process, it is not practical to add at the start of the process a sufficient quantity to provide the necessary amount down to the end. Furthermore, if the total amount of glue is added at the start of electrolysis, the initial product formed will contain an excessive amount of the colloid and the final portion of the electrolytic product may be red.

Fungicidal tests of the yellow oxide made by the above process have shown a remarkable increase in effectiveness without a corresponding increase in phytocidal activity. The greatly increased activity of this new form of cuprous oxide over previously known forms is illustrated by the following experimental results against *Macrosporium sarcinaeforme*. Plates were coated with spores and then sprayed by a standardized procedure. The slides were incubated at 27° C. overnight and examined for germination the following day. All determinations were made in duplicate.

Table I

| Material | Concentration | Application ratio | Per cent germination |
| --- | --- | --- | --- |
| | Per cent | | |
| Ignition $Cu_2O$ | 0.2 | 4 | 96.5 |
| | | 2 | 98.3 |
| | | 1 | 98.4 |
| Red $Cu_2O$ | 0.2 | 4 | 55.0 |
| | | 2 | 81.7 |
| | | 1 | 94.2 |
| Yellow $Cu_2O$ | 0.1 | 4 | 6.9 |
| | | 2 | 22.5 |
| | | 1 | 55.4 |

Although the yellow oxide was sprayed at half the concentration of the dark red cuprous oxide made by ignition or of the bright red cuprous oxide made by electrolysis without a protective colloid, germination was markedly less with the yellow oxide. The application ratio indicates the relative amounts of solutions sprayed on a given plate. The actual amount of toxic deposited depends, of course, upon the volume of spray as well as the concentration of the toxic in the spray.

In damping off studies it was similarly found that significantly greater emergence was obtained from seeds treated with the yellow form as compared with seeds treated with the red form.

*Table II*

Germination of pea seed under constant conditions of moisture and temperature (in per cent):

| Concentration | Ignition oxide | Red oxide | Yellow oxide |
|---|---|---|---|
| .063 | 21 | 48 | 54 |
| .125 | 44 | 65 | 78 |
| .25 | 57 | 67 | 81 |

The result of treating pea seed is reflected directly in yields for a given weight of seed. Red and yellow oxides separately were applied to pea seed of the Perfection variety at the rate of one-quarter pound per 100 pounds of seed. In addition two ounces of graphite was mixed with each quarter pound of oxide to give improved action in the seed drills. Five plots were planted with pea seed treated with red oxide, five plots with an equal weight of seed treated with yellow oxide, and five plots were planted with an equal weight of untreated seed as a control. The average number of pods was 34% greater on plots where the seed was treated with red oxide than on untreated plots. The average number of pods was 59% greater on plots where the seed was treated with yellow oxide than on untreated plots.

Yellow cuprous oxide may be applied to plants along with suitable spreaders and stickers such as goulac, casein, milk powder, blood albumen, synthetic wetting agents, etc., and in conjunction with other insecticidal and fungicidal material, such as lead, magnesium or calcium arsenate, Paris green, various arsenites, sulfur, ground cryolite, nicotine sulfate, organic thiocyanates, derris, pyrethrum, cubé, etc. Because the yellow oxide is so extremely fine, it tends to give highly uniform deposits of high tenacity. The properties may, however, be enhanced by the use of such preparations as have been found effective for red cuprous oxide. For example, a mixture of four parts of yellow cuprous oxide, two parts of magnesium oxide, and one part of the dry sulfite-cellulose residue known as "Goulac" makes a particularly useful preparation for applying and holding cuprous oxide on foliage. As has been disclosed in copending application Serial No. 206,377, filed May 6, 1938, when red oxide is used in this mixture, the tenacity of cuprous oxide is increased about fourfold with resulting increased effectiveness of the fungicidal material. The use of yellow oxide in place of red gives still better results.

For example, in the control of mildew and black spot on roses it was found that, when red oxide was used, three ounces of a preparation, with proportions as given above, in 50 gallons of spray along with 0.125% of emulsified cottonseed oil gave satisfactory control of these infestations. The same control was obtained by substituting one to two ounces of the yellow preparation. An important feature of these sprays on roses, flowers, and ornamentals rests upon the observation that they allow retention of the natural sheen and original appearance of the plants.

Of many comparisons which have been made with red and yellow cuprous oxide, the following results on potatoes are typical. The composition of both red and yellow mixtures used was four parts of cuprous oxide, two parts of magnesium oxide and one part of Goulac and these mixtures were used at one and a half and one pound per 50 gallons of spray. Along with these mixtures there was added three pounds of talc for each 50 gallons of spray to increase their effectiveness against leaf hoppers.

*Table III* a. Leaf hopper control on red skin potatoes:

| Oxide used | Mixture in spray | Percent decrease of hoppers |
|---|---|---|
| Red | 1.5 lbs./50 gals. | 37 |
|  | 1 lb. /50 gals. | 32 |
| Yellow | 1.5 lbs./50 gals. | 71 |
|  | 1 lb. /50 gals. | 58 | b. Control of blight on red skin potatoes:

| Oxide used | Mixture in spray | Percent leaves free | Percent leaves infected Mod. | Severe | Dead |
|---|---|---|---|---|---|
| Red | 1.5 lbs./50 gals. | 42 | 26 | 8 | 24 |
|  | 1 lb. /50 gals. | 33 | 33 | 9 | 25 |
| None |  | 2 | 10 | 17 | 71 |
| Yellow | 1.5 lbs./50 gals. | 52 | 27 | 5 | 16 |
|  | 1 lb. /50 gals. | 48 | 25 | 6 | 21 |

The yellow cuprous oxide made as described herein is particularly effective when used in conjunction with emulsified oils such as various vegetable oils, of which cotton seed oil is an example, or mineral spray oils of a viscosity between 50 and 120 seconds (Saybolt) at 100° F. and an unsulfonatable residue above 60%. The oil is preferably emulsified with a wetting agent such as the sulfated ethers, sulfated alcohols, or one of the oil-soluble condensates obtained by condensing fatty acid, such as lauric acid, with polyglycerol and a resin-forming carboxylic acid, such as phthalic acid, as disclosed in application Serial No. 259,317, filed March 2, 1939. From 0.125% to 1.0% of such emulsified oils may be used to spread and hold the cuprous oxide.

A mixture containing a neutral absorptive clay and yellow cuprous oxide has been found unusually effective and exceptionally safe in sprays. Usually an alkaline reacting substance, such as lime or magnesia, is added to copper fungicides to repress the formation of soluble copper compounds. The addition of such alkaline substances lessens the danger of copper injury to the plant but at the same time increases the danger of alkali injury. Neutral absorptive clays, I have found, protect the plants from copper injury without introducing a new danger. Whether the protective action is due to absorption of soluble copper by the clay, to absorption of plant excretions which would accelerate the liberation of soluble copper salts, or to other causes is not definitely known at the present time. Nevertheless, compositions containing such clays as kaolin and cuprous oxide have proved to be highly effective and safe parasiticides. If desired, a small amount of wetting, sticking or dispersing agents may also be used along with the clay and yellow oxide. The clay and cuprous oxide may also be used with other toxic materials, such as arsenates, etc.

Dusts may be prepared containing yellow cuprous oxide by mixing clays, talc, asbestine, flours, etc. with the yellow oxide as well as with other active materials such as rotenone dust, calcium arsenate, etc. It has been found that more uniform dry mixing of active materials, including yellow oxide, is obtained by treating them in a preliminary step with a solution of a lyophilic protein colloid, such as glue, gelatine, or albumen, and then treating with a tanning agent, such as alum, tannic acid, or a syntan, drying, and finally mixing the active ingredient with diluent, sticker, etc. Materials thus prepared have been found to be exceptionally well and uniformly dispersed in dry mixes with diluents.

The new, dry, yellow form makes possible more effective anti-fouling paints. It is also useful as an agent for controlling wild growth in swimming pools and ponds. Because of its light color it is not particularly noticed and because of its very fine state of subdivision it is well suspended and sufficiently active to kill algae without killing fish or being unpleasant to swimmers.

I claim:

1. A fungicidal composition containing a yellow cuprous oxide substantially all of the particles of which are less than four microns in diameter characterized by its color, its fine state of subdivision, its high copper content, and the presence of a small amount of a lyophilic protein colloid within and surrounding the particles thereof.

2. A stable form of cuprous oxide substantially all of the particles of which are less than four microns in diameter characterized by a yellow color, and a high copper content, and the presence of a small amount of a lyophilic protein colloid within and surrounding the particles.

3. A fungicidal composition as described in claim 1 wherein the lyophilic protein colloid is glue

LOREN C. HURD.